(12) United States Patent
Raj et al.

(10) Patent No.: US 10,824,532 B2
(45) Date of Patent: Nov. 3, 2020

(54) DUMP ANALYSIS GENERATION

(71) Applicant: SAP SE, Walldorf (DE)

(72) Inventors: Reivin Richards Raj, Bangalore (IN); Aparna Vohra, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/161,419

(22) Filed: Oct. 16, 2018

(65) Prior Publication Data
US 2020/0117567 A1    Apr. 16, 2020

(51) Int. Cl.
*G06F 11/32* (2006.01)
*G06F 11/34* (2006.01)
*G06F 11/36* (2006.01)

(52) U.S. Cl.
CPC ........ *G06F 11/323* (2013.01); *G06F 11/3476* (2013.01); *G06F 11/3612* (2013.01); *G06F 11/3664* (2013.01)

(58) Field of Classification Search
CPC .............. G06F 11/323; G06F 11/3476; G06F 11/3612; G06F 11/3664
USPC ......................................................... 717/125
See application file for complete search history.

(56) References Cited

U.S. PATENT DOCUMENTS

| | | | | |
|---|---|---|---|---|
| 6,542,841 B1* | 4/2003 | Snyder | ............... | H04B 10/0795 372/26 |
| 2004/0194063 A1* | 9/2004 | Pereira | ................ | G06F 11/3688 717/124 |
| 2008/0016500 A1* | 1/2008 | Hinkley | ............... | G06F 11/3476 717/128 |
| 2011/0107307 A1* | 5/2011 | Liu | ...................... | G06F 11/3664 717/125 |
| 2012/0204153 A1* | 8/2012 | Peterson | ............. | G06F 11/3672 717/124 |
| 2012/0246334 A1* | 9/2012 | Yang | ................... | H04L 67/2823 709/232 |
| 2014/0310558 A1* | 10/2014 | Masser | ................... | G06F 11/36 714/32 |
| 2015/0149417 A1* | 5/2015 | Foebel | .................... | H04L 43/10 707/687 |

(Continued)

OTHER PUBLICATIONS

Chaudhury et al., "Event-Driven Software Testing—an Overview," Ijarcet, 2016, 5pg. (Year: 2016).*

(Continued)

*Primary Examiner* — Ryan D. Coyer
(74) *Attorney, Agent, or Firm* — Buckley, Maschoff & Talwalkar LLC

(57) ABSTRACT

A method includes recording, in a first database table, user interactions of one or more users with a user interface, retrieving a list of runtime errors that have occurred in a system resulting from the user interactions, for each runtime error in the list, identifying a type of the runtime error comprising one of a first type and a second type, and retrieving a corresponding call stack comprising a sequence of function calls that led to the runtime error, storing information from the call stack in a second database table, correlating the user interactions recorded in the recording step with the function calls in the call stack, and providing, on a display device, a visual reproduction of processing steps leading up to the runtime error using the correlations in the correlating step.

20 Claims, 8 Drawing Sheets

(56) References Cited

U.S. PATENT DOCUMENTS

2018/0129597 A1* 5/2018 Anaya ................. G06F 11/3692
2019/0184282 A1* 6/2019 Jones ..................... A63F 13/92

OTHER PUBLICATIONS

Haller, Klaus, "Mobile Testing," ACM, 2013, 8pg. (Year: 2013).*
Hibschman et al., "Unravel: Rapid Web Application Reverse Engineering via Interaction Recording, Source Tracing, and Library Detection," ACM, 2015, 10pg. (Year: 2015).*

* cited by examiner

| Runtime Errors | Edit | Goto | System | Help |

700 ─►

Runtime Error Long Text

▶ 🗁 Runtime Error
▼ 🗁 System Environment
   • System Environment
   • User and Transaction
▶ 🗁 ABAP Developer View
   • Short Text
   • Chosen Variables
   • Active Calls/Events

710 ⌐

| Category | Runtime Errors |
|---|---|
| Runtime Errors | ABAP programming error |
| ABAP Program | MESSAGE_TYPE_X |
| Application Component | CL_SWF_RUN_WIM_LOCAL===========CP |
| Date and Time | BC-BMT-WFM |
|  | 30.08.2018  12:56:36 |

720

Active Calls/Events

| No. | Type | Name | Program | Include | Line |
|---|---|---|---|---|---|
| 14 | METHOD | CL_SWF_RUN_WIM_LOCAL==========CP | CL_SWF_RUN_WIM_LOCAL=>IF_SWF_RUN_WIM_UTL_INTERNAL~GET_SYSTEM_USER | CL_SWF_RUN_WIM_LOCAL==========CM088 | 10 |
| 13 | METHOD | CL_SWF_RUN_DEADLINE==========CP | CL_SWF_RUN_DEADLINE=>GET_SYSTEM_USER | CL_SWF_RUN_DEADLINE==========CM00N | 3 |
| 12 | METHOD | CL_SWF_RUN_DEADLINE==========CP | CL_SWF_RUN_DEADLINE=>GET_DEADLINE | CL_SWF_RUN_DEADLINE==========CM009 | 21 |
| 11 | METHOD | CL_SWF_RUN_DEADLINE==========CP | CL_SWF_RUN_DEADLINE=>GET_SWWSWIDEAD | CL_SWF_RUN_DEADLINE==========CM00J | 34 |
|  |  |  | ... | | |
| 1 | EVENT | RSWWDHEX_INTERNAL | START-OF-SELECTION | RSWWDHEX_INTERNAL | 409 |

DUMP ANALYSIS GENERATION

BACKGROUND

Debugging, or finding and fixing errors that occur at runtime, is often a tedious and difficult task. Currently, a tremendous amount of effort is being spent by developers and testers in analyzing dump (e.g., runtime error) details in a system to deduce and fix the underlying cause of the problem. Typically, this is done by reproducing the scenario that led to the dump. Not only is this manual process time-consuming and resource intensive, the results are prone to human errors. Moreover, testers are often unable to replicate certain dump scenarios due to, for example, more complex or long scenarios, or errors that are simply not reproducible.

Therefore, a dump analysis generation technique and system is desired that automatically analyzes dumps encountered in a system and is able to efficiently recreate a scenario in a user interface which led to a dump. Possible advantages of such a technique and system include a cost-effective and early identification of errors, maximum bugless or errorless resulting product for customers, and the ability to identify and quarantine dump prone areas/components in a system.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an outward view of a user interface according to some embodiments.

Figure 1:
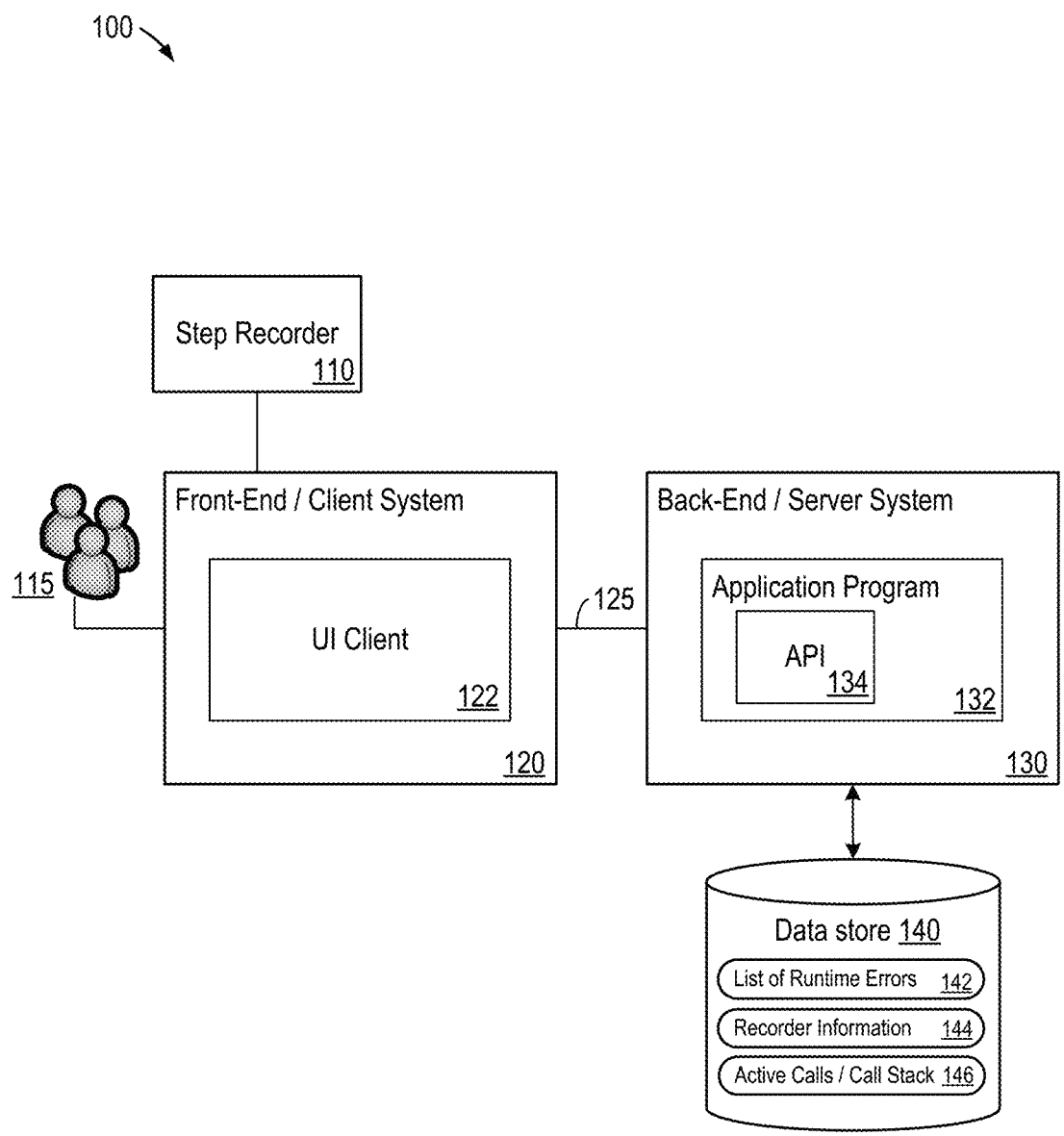
FIG. 1 is a block diagram of a system architecture according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to software debugging, and more specifically to a program or tool that assists developers and testers and the like in diagnosing system dumps (e.g., runtime errors).

Generally, the program or tool (e.g., dump generator) automatically analyzes every dump that is encountered in a system and a scenario which led to the dump is re-created on a display device. A visual reproduction of processing steps leading up to the dump may be provided on a user interface.

In some examples, the embodiments herein may be incorporated within software that is deployed on a cloud platform.

The environments described herein are merely exemplary, and it is contemplated that the techniques described may be extended to other implementation contexts.

One or more embodiments that include one or more of the advantages discussed are described in detail below with reference to the figures.

FIG. 1 is a block diagram of a system architecture 100 according to some embodiments. Architecture 100 includes step recorder 110, front-end/client system 120, back-end/server system 130, and data store 140. Data store 140 may store a list of runtime errors 142, step recorder information 144 (e.g., information generated from step recorder 110), and active calls/call stack information 146. Front-end/client system 120 includes user interface (UI) client 122. Back-end/server system 130 includes application program 132 and application programming interface (API) 134. Each of the illustrated components may be implemented by software and/or one or more hardware elements, with some software and/or hardware elements being shared among more than one illustrated component.

System 100 includes a simplified example of client-server architecture. One or more users 115, e.g., developer or tester, etc., may operate on one or more client systems 120. Users 115 may request different services or execute various operations available within client systems 120, or provided by one or more server systems 130 via network 125. The illustrated server system 130 represents one or more back-end nodes in the computer system environment 100. In one embodiment, users 115 generate services requests at UI client 122. When a user performs an operation on UI client 122, code in back-end 130 is touched, and programs, function modules, or classes are executed. In turn, a response is generated which is returned to UI client 122.

Some of the elements of the computer system environment 100 resemble the structure and functionality of software modules developed by SAP AG. However, structures with similar functionalities could be found in software products developed by other vendors, as well. Alternative embodiments may utilize other kinds of computer system architectures.

The involved client systems 120 may have similar or different structures where one or more of the illustrated modules are replicated. One or more users 115 may operate within one or more instances of UI client 122 of one or more of client systems 120. Different users 115 may exclusively access different instances of the UI client 122 within a same client system 120. In one embodiment, any of the client systems 120 may execute a standalone client application via UI client 122 to interact with the backend server system 130.

UI client instances or sessions 122 may embed into a browser integrated framework. UI client 122 accesses the necessary business data at the backend 130 via network 125. The communication with the backend 130 may include extracting, storing and updating data. The data may be transported to data store 140.

One or more software applications 132 are executed at server runtime. For example, the applications 132 may provide a number of services for the users 115, where various operation requests related to the services are created at client systems 120. The requests are translated to corresponding process tasks performed by the applications 132 executed in server runtime.

In one embodiment, users 115 may instantiate, change or execute a program component, a data object or some other type of computer system artifact by manipulating UI components associated with a particular application or software tool. The UI components may be available within a graphical user interface (GUI) environment of the UI client 122. The manipulations of the UI components of UI client 122 may trigger execution of various system or application procedures in server runtime.

Generally, there are two types of dumps (e.g., exceptions) that may occur in system 100: a first type that corresponds to a runtime error that occurred in front-end system 120 accessible by the one or more users 115, namely, an Open Data Protocol (OData) dump, and a second type that corresponds to a runtime error that occurred in back-end system 130, namely, a Web graphical user interface (WebGUI) dump.

Figure 2:
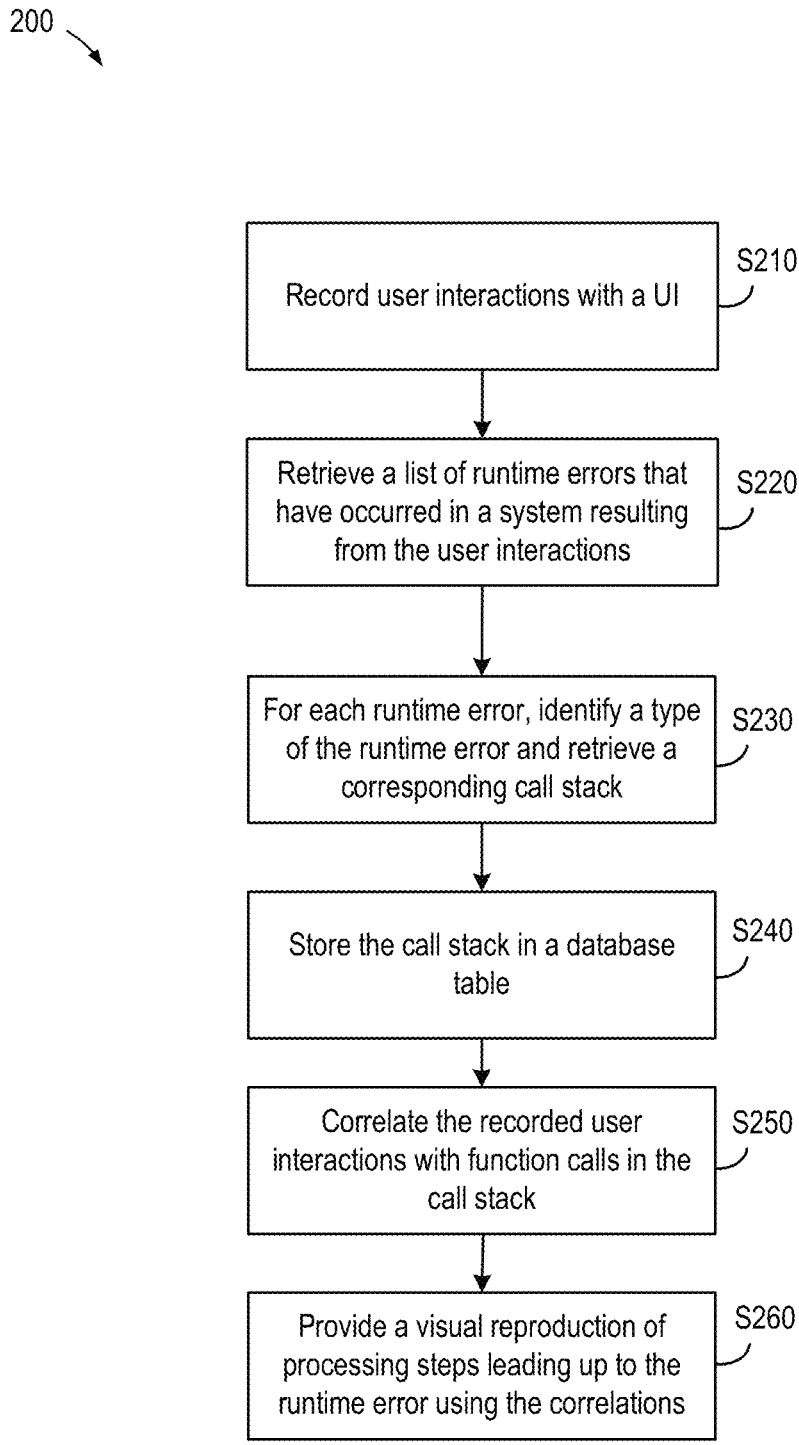
FIG. 2 is a flow diagram illustrating an exemplary process according to some embodiments.
Figure 3:
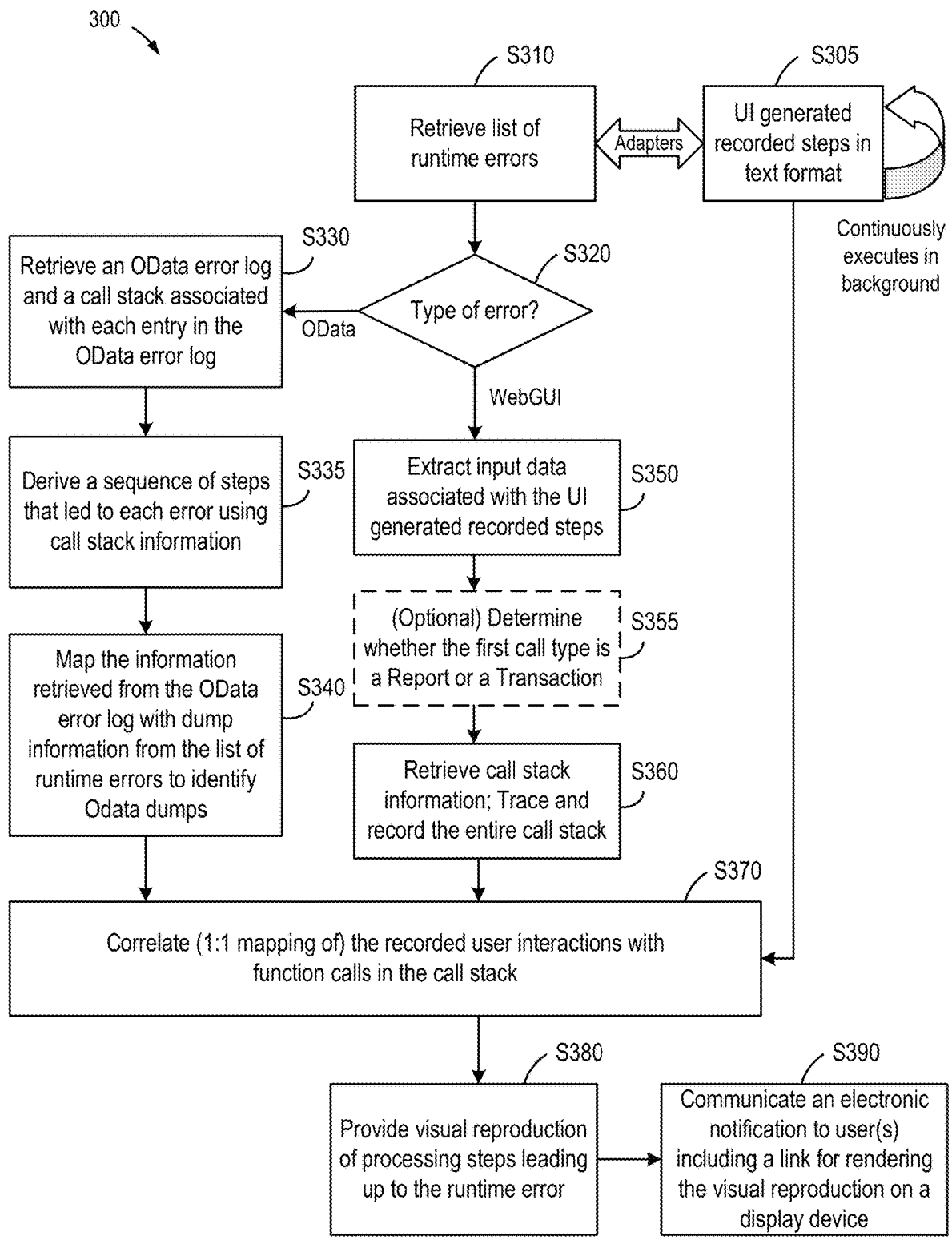
FIG. 3 is a more detailed flow diagram illustrating an exemplary process according to some embodiments.

In one embodiment, the application program 132 implemented in back-end/server system 130 may include the tasks described as elements of processes 200 and 300 illustrated in FIG. 2 and FIG. 3, respectively.

Data store 140 may comprise any query-responsive data source or sources that are or become known, including but not limited to a structured-query language (SQL) relational database management system. Data store 140 may comprise a relational database, a multi-dimensional database, an eXtendable Markup Language (XML) document, or any other data storage system storing structured and/or unstructured data. The data of data store 140 may be distributed among several relational databases, dimensional databases, and/or other data sources. Embodiments are not limited to any number or types of data sources.

In some embodiments, the data of data store 140 may comprise one or more of conventional tabular data, row-based data, column-based data, and object-based data. Moreover, the data may be indexed and/or selectively replicated in an index to allow fast searching and retrieval thereof. Data store 140 may support multi-tenancy to separately support multiple unrelated clients by providing multiple logical database systems which are programmatically isolated from one another.

Data store 140 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

FIG. 2 is a flow diagram illustrating an exemplary process 200 according to some embodiments. Initially, at S210, as a user interacts with UI client 122, the user's actions (e.g., inputs) are recorded by a recording device, such as step recorder 110. The user's input tracked by step recorder 110 may include any type of suitable user input, such as keystrokes, menu selections, audio input, mouse clicking, mouse movements, opening and closing of windows, etc. In some embodiments, this input is converted into text form in a background process and stored (e.g., in a file or document). Information 144 recorded by step recorder 110 may be stored (e.g., in a database table) in data store 140.

Next at S220, a list of runtime errors (e.g., dumps) 142 that have occurred in a system resulting from the user interactions is retrieved. In some embodiments, the list of runtime errors may be listed according to a particular time interval (e.g., from yesterday and today). In other embodiments, the list of runtime errors may be selected according to user selections such as by user, date, and other parameters. For each runtime error, at S230, a type of the runtime error (e.g., one of a first type and a second type) is identified and a corresponding call stack or list of active calls (e.g., a sequence of function calls that led to the runtime error) is retrieved. At S240, call stack information 146 may be stored (e.g., in a database table) in data store 140. In turn, at S250, the user interactions recorded by the recording device at S210 are correlated (e.g., mapped) with the function calls in the call stack at S240.

As a result, at S260, a visual reproduction of processing steps leading up to the runtime error may be provided on a display device using the correlations results from S240. A developer or tester may view on a display screen a recreation or rerun of the scenario or circumstances that led to the error. In some embodiments, the recreation includes a series of images, video frames, animations, and/or step-by-step visualization of events that occurred during a certain time period leading up to the error.

This process is shown in more detail in FIG. 3, which will now be discussed together with FIGS. 4-7.

In FIG. 3, in the same manner as shown in FIG. 2, a list of runtime errors that have occurred in a system is retrieved at S310. For each runtime error, at S320, a type of the runtime error is identified. In one embodiment, the type of the runtime error is classified as being either an OData error or a WebGUI error.

If it is determined at S320 that the type of the runtime error is an OData error, process 300 continues to step S330, where an OData error log and a call stack associated with each entry in the OData error log is retrieved. At S335, a sequence of steps that led to each error may be derived using call stack information.

Figure 4:
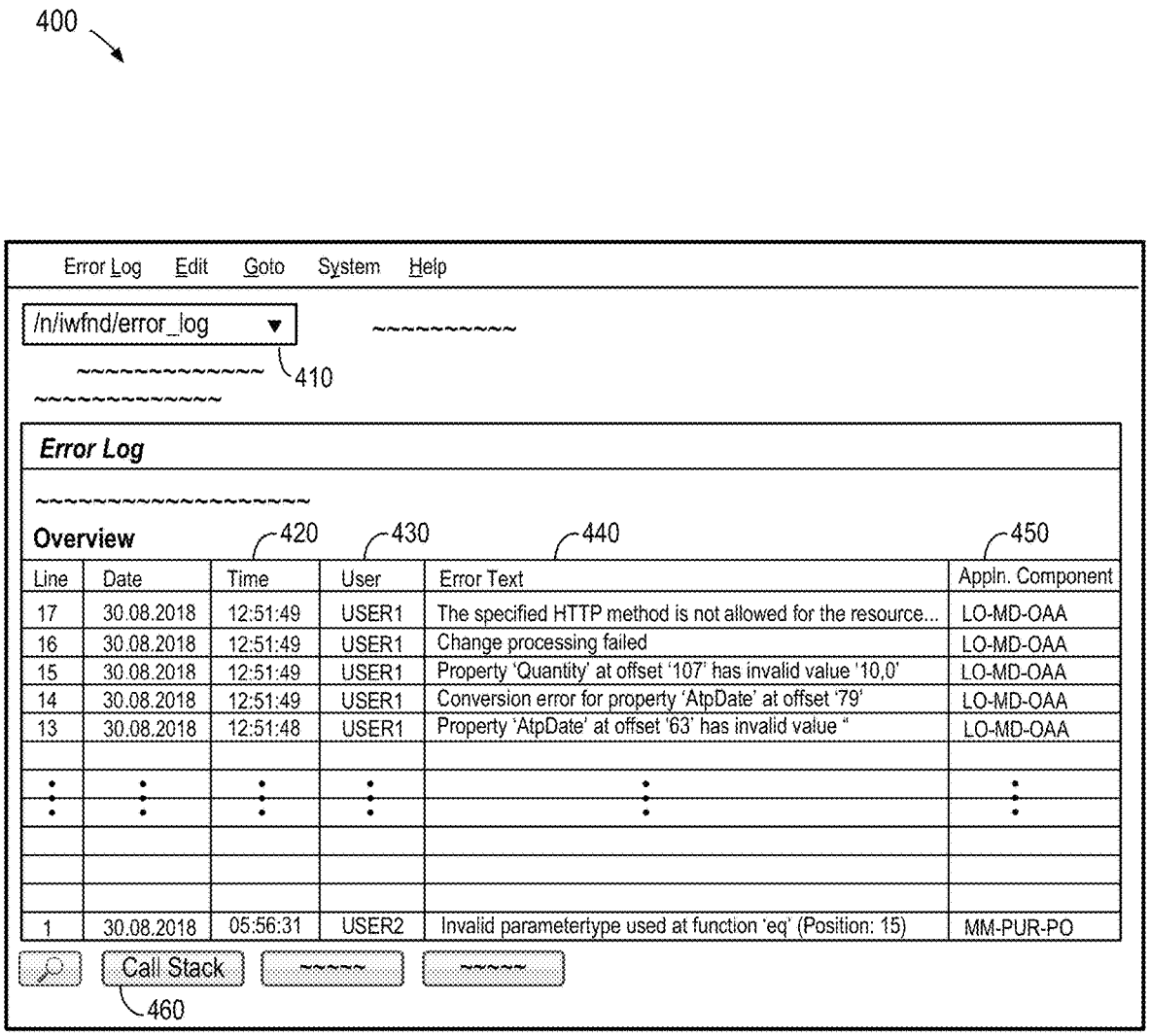
FIG. 4 is an outward view of a user interface according to some embodiments.

FIG. 4 illustrates an OData error log screen 400 according to some embodiments. Application program 132 may generate transaction code 410 to retrieve the error logs of OData services. The fields of the OData error log may include, but are not limited to, timestamp information 420 (e.g., date and time of the runtime error), user information 430, error message information 440 (e.g., exception that led to the runtime error), and any related program or application component 450. "Call Stack" button 460 may be used to retrieve a call stack for each entry in the OData error log.

Figure 5:
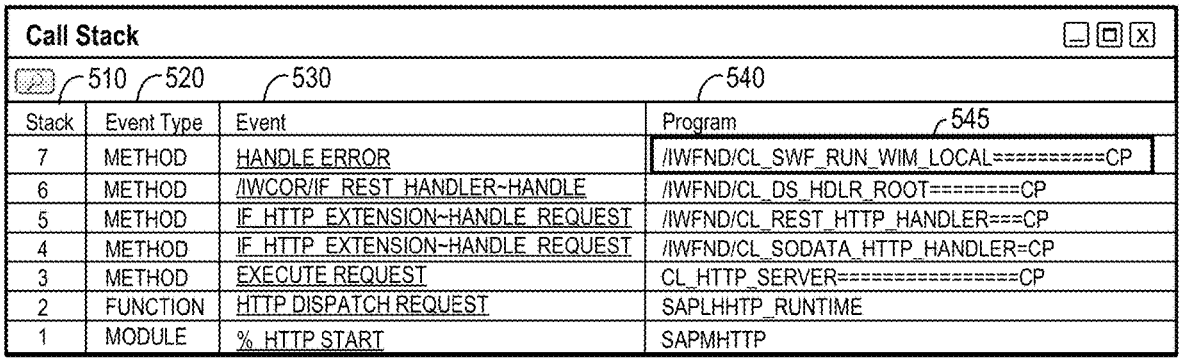
FIG. 5 is an outward view of a user interface according to some embodiments.

FIG. 5 illustrates a user interface 500, which is obtained in response to selection of the "Call Stack" tool or button 460 of FIG. 4. FIG. 5 illustrates a call stack according to some embodiments, comprising a sequence of function calls or flow of steps (e.g., numbered 1 through 7) that led to a runtime error. A separate corresponding call stack may be retrieved for each entry (e.g., numbered 1 through 17) of OData error log 400. The fields of the call stack may include, but are not limited to, stack depth 510, event type 520 (e.g., method, function, or module), event name 530, and program name or identifier 540.

A last step in each call stack identifies a program that was invoked which led to an error. As shown in FIG. 5, for example, the last step (e.g., numbered 7) in call stack 500 identifies a program 545 by program name "CL_SWF_RUN_WIM_LOCAL=========CP". In some embodiments, information relating to the last step (e.g., method) called may be stored in a variable and later retrieved for matching.

Continuing in FIG. 3, at S340, information retrieved from the OData error log including call stack information (e.g., at S330 and S335) is mapped with dump information from the retrieved list of runtime errors (e.g., at S310) to identify OData dumps. More specifically, if a program 545 identified in the last step of the call stack is present in the retrieved list of runtime errors 640 (e.g., there is a match), then the error is classified an OData dump, and may be quarantined for dump analysis. On the other hand, if a program 545 is not present in the retrieved list of runtime errors 640, then the error is classified as a non-OData dump (e.g., an error that is not a result of a system dump), and is ignored. Instead, the error may have resulted from another issue such as a user authorization issue or an issue with a remote function call (RFC). In this way, errors that are not OData dumps may be effectively eliminated from consideration.

Figure 6:
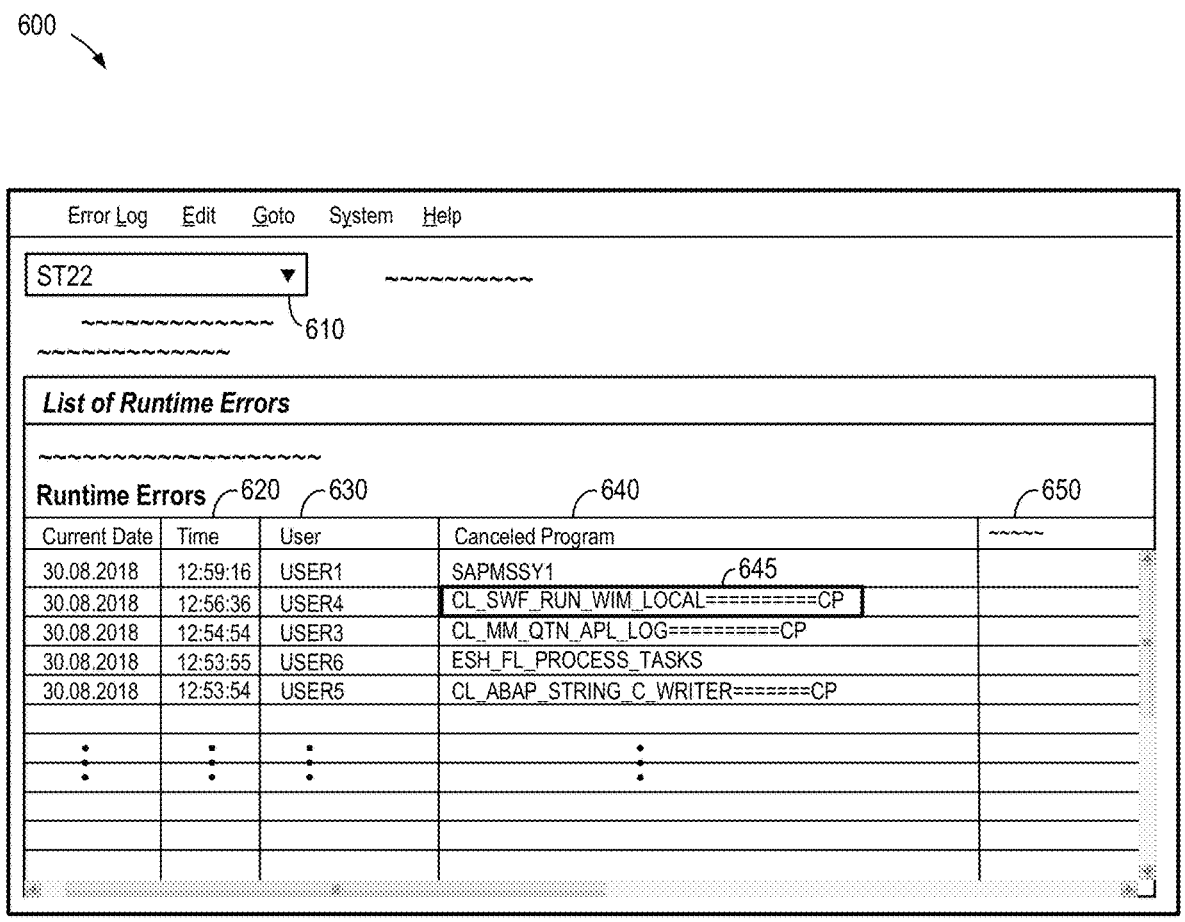
FIG. 6 is an outward view of a user interface according to some embodiments.

FIG. 6 illustrates a list of runtime errors screen 600 according to some embodiments. Application program 132 may generate transaction code 610 to retrieve the list of runtime errors that have occurred in the system (e.g., all exceptions that have occurred in the system from end users over a period of time). In one example, program name 545 of the last method called in call stack 500 matches a program name 645 in the list of runtime errors 600. Using this mapping, details including user information 630 and timestamp information 620 may be deduced.

In some embodiments, in addition to mapping information based on program name/ID 545, 645, as described above, the mapping of information at S340 may additionally be based on user information (e.g., mapping user information 430 with user information 630).

Continuing in FIG. 3, if it is determined at S320 that the type of the runtime error is a WebGUI error, process 300 continues to step S350, where input data associated with the UI generated recorded steps is extracted. In some embodiments, the input data may be provided from a file (e.g., in text format) generated at S305 (e.g., using step recorder 110).

For each runtime error in the list of runtime errors 600, a corresponding set of Active Calls/Events 720 (e.g., call stack) is retrieved at S340. FIG. 7 illustrates a list of Active Calls/Events 720 corresponding to a single dump, similar to the call stack information 500 shown in FIG. 5. The set of Active Calls/Events 720 provides information on the sequence of events/steps that were performed which led to a dump (e.g., in this case, WebGUI dumps occurring on the back-end system).

Optionally, at S355, the call type of a first call 725 in call stack 720 derived. A first step 725 (e.g., "start-of-selection") in each call stack 720 identifies the runtime error as resulting from a report or a transaction, based on a transaction name. As shown in FIG. 7, for example, the first step (e.g., numbered 1) in call stack 720 identifies a transaction by transaction name "RSWWDHEX", which relates to scheduling a background job for generating a report for deadline monitoring. Generally, a report runs in the background and a transaction occurs at the front-end with user interaction at client interfaces. This optional step provides a developer or tester with additional context in classifying the WebGUI dumps.

Next, at S360, the entire retrieved call stack is traced and recorded in a data store. A snapshot may be created for every active call listed in the call stack, and those snapshots may be stored in a folder created for a particular dump. In an example embodiment, the trace is activated using API function module 134 and recorded in data store 140 of FIG. 1.

In both cases, for OData dumps and WebGUI dumps, the entire trace of the call stack is mapped, at S370, with the recorded user interactions from initial step S210. In an example embodiment, a one-to-one mapping is established between a database table comprising the recorder steps (e.g., input data) and a database table comprising the active calls/call stack information (e.g., function calls invoked). Based on the mapping information at S370, a visual reproduction of processing steps leading up to the runtime error may be produced, at S380. For example, the input data from the step recorder may be passed to the function modules for recreating the scenario that led to the dump.

In some embodiments, at S390, an electronic notification may be communicated to at least one user, which may include a link for rendering (e.g., on a display device) the visual reproduction of the processing steps leading up to the runtime error. Advantageously, the entire scenario that led to the dump is automatically and accurately reproduced without much effort by a developer or tester.

Additionally or alternatively, in some embodiments, a report file including error details, application component information, and user information, may be generated for every dump. In particular, the application component information provides developers and testers with details that allow them to more easily identify and quarantine dump prone areas/components in a system, and to more quickly transfer the incident to the right maintenance specialist or software developer best suited to analyze and solve the problem.

As discussed above, processes 300 and 400 may be performed by the software and/or the system described herein. Application program 132 implemented in back-end/server system 130, which may include the tasks described as elements of processes 200 and 300 illustrated in FIG. 2 and FIG. 3, respectively, is configured to access and automatically navigate to the information provided in FIGS. 4-7.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Figure 8:
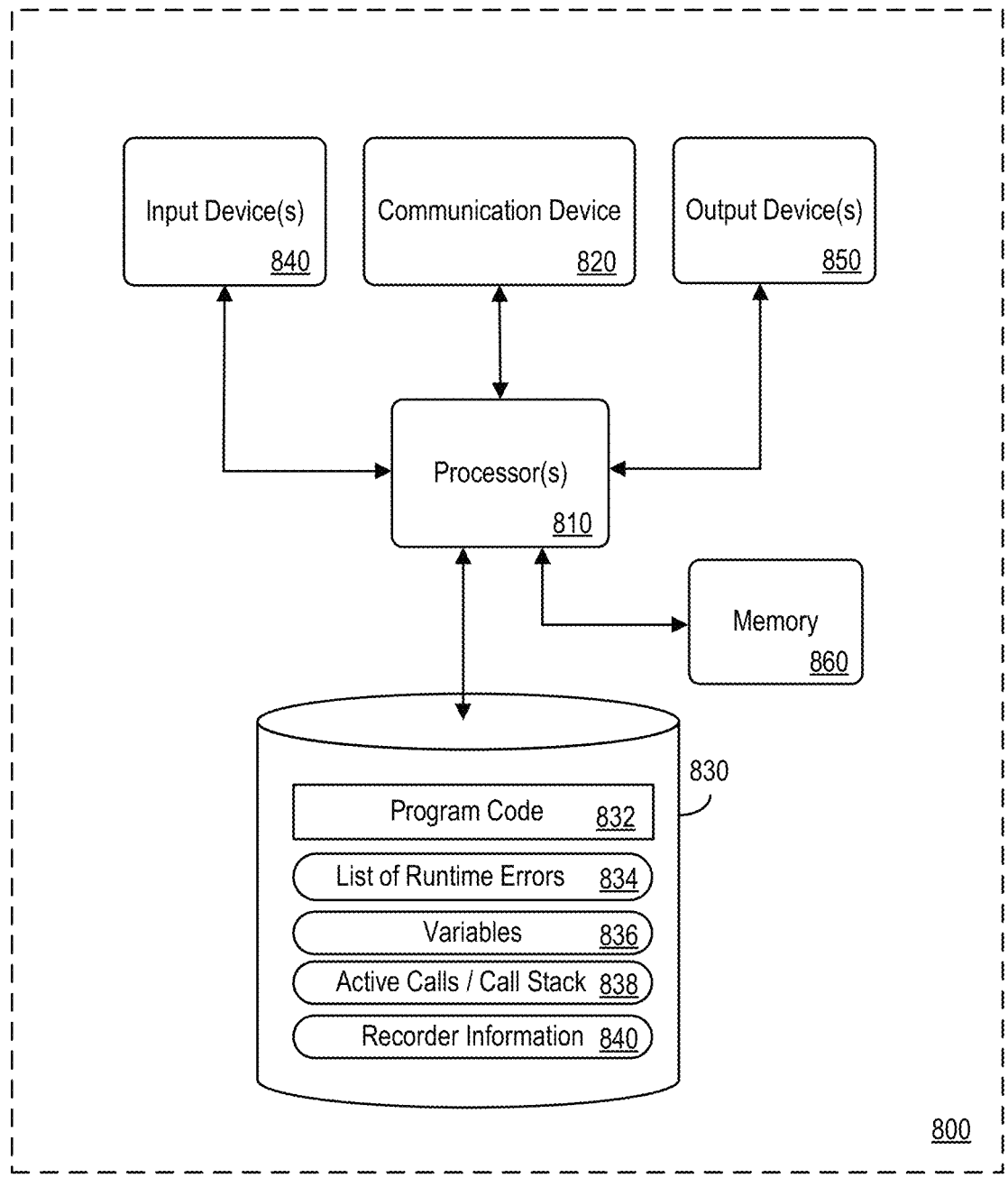
FIG. 8 is a block diagram of an apparatus according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other unshown elements according to some embodiments.

Apparatus 800 includes processor 810 operatively coupled to communication device 820, data storage device 830, one or more input devices 810, one or more output devices 850, and memory 860. Communication device 820 may facilitate communication with external devices, such as a step recorder 110. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen), a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Program code 832 of data storage device 830 may be executable by processor 810 to provide functions described herein, including but not limited to processes 200 and 300. Embodiments are not limited to execution of these functions by a single apparatus. Data storage device 830 may also store a list of runtime errors 834, variables 836, active calls/call stack information 838, recorder information 840. Data storage device 830 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
    recording, in a first database table, user interactions of one or more users with a user interface, wherein the user interactions comprise one or more manual user inputs;
    retrieving a list of runtime errors that have occurred in a system resulting from the user interactions;
    for each runtime error in the list, identifying a type of the runtime error comprising one of a first type and a second type, and retrieving a corresponding call stack comprising a sequence of function calls that led to the runtime error;
    storing information from the call stack in a second database table;
    correlating the user interactions recorded in the recording step with the function calls in the call stack; and
    presenting, on a display device, a visual reproduction of processing steps leading up to the runtime error using the correlations in the correlating step, the visual reproduction comprising one or more of a series or images, video frames, animation or a step-by-step visualization of events which occurred during a particular time interval and prior to one or more of the runtime errors in the list.

2. The method of claim 1, further comprising retrieving a list of runtime errors for a particular time interval.

3. The method of claim 1, further comprising converting data recorded from the user interactions into a text format.

4. The method of claim 1, wherein the first type corresponds to a runtime error that occurred in a front-end system accessible by the one or more users and the second type corresponds to a runtime error that occurred in a back-end system.

5. The method of claim 4, wherein the first type corresponds to an Open Data Protocol (OData) error and the second type corresponds to a Web graphical user interface (WebGUI) error.

6. The method of claim 1, wherein, in a case where the first type of the runtime error is identified,
retrieving an error log corresponding to runtime errors of the first type, including user information, timestamp information, and error message information;
for each entry in the error log, retrieving a corresponding call stack, wherein a last step in each call stack identifies a program that was invoked which led to an error; and
mapping the program identified in the last step with the list of runtime errors that have occurred in the system to determine whether the error is a result of a system dump.

7. The method of claim 1, wherein, in a case where the second type of the runtime error is identified,
extract input data associated with the user interactions of the one or more users with the user interface; and
for each runtime error of the second type, retrieving a corresponding call stack and identifying the runtime error as resulting from a report or a transaction.

8. The method of claim 1, further comprising communicating an electronic notification to at least one user which includes a link for rendering, on the display device, the visual reproduction of the processing steps leading up to the runtime error.

9. A system comprising:
a processor; and
a memory in communication with the processor, the memory storing program instructions, the processor operative with the program instructions to perform the operations of:
recording user interactions of one or more users with a user interface, wherein the user interactions comprise one or more manual user inputs;
retrieving a list of runtime errors that have occurred in a system resulting from the user interactions;
for each runtime error in the list, identifying a type of the runtime error and retrieving a corresponding call stack comprising a sequence of function calls that led to the runtime error;
storing information from the call stack;
correlating the recorded user interactions with the function calls in the call stack; and
presenting a visual reproduction of processing steps leading up to the runtime error based on the correlations between the recorded user interactions and the function calls, the visual reproduction comprising one or more of a series or images, video frames, animation or a step-by-step visualization of events which occurred during a particular time interval and prior to one or more of the runtime errors in the list.

10. The system of claim 9, further comprising retrieving a list of runtime errors for a particular time interval.

11. The system of claim 9, further comprising converting data recorded from the user interactions into a text format.

12. The system of claim 9, wherein a type of the runtime error comprises one of a first type and a second type, the first type corresponds to a runtime error that occurred in a front-end system accessible by the one or more users and the second type corresponds to a runtime error that occurred in a back-end system.

13. The system of claim 9, wherein the first type corresponds to an Open Data Protocol (OData) error and the second type corresponds to a Web graphical user interface (WebGUI) error.

14. The system of claim 9, wherein, in a case where the first type of the runtime error is identified,
retrieving an error log corresponding to runtime errors of the first type, including user information, timestamp information, and error message information;
for each entry in the error log, retrieving a corresponding call stack, wherein a last step in each call stack identifies a program that was invoked which led to an error; and
mapping the program identified in the last step with the list of runtime errors that have occurred in the system to determine whether the error is a result of a system dump.

15. The system of claim 9, wherein, in a case where the second type of the runtime error is identified,
extract input data associated with the user interactions of the one or more users with the user interface; and
for each runtime error of the second type, retrieving a corresponding call stack and identifying the runtime error as resulting from a report or a transaction.

16. The system of claim 9, further comprising communicating an electronic notification to at least one user which includes a link for rendering, on the display device, the visual reproduction of the processing steps leading up to the runtime error.

17. A non-transitory computer readable medium having stored therein instructions that when executed cause a computer to perform a method comprising:
recording user interactions of one or more users with a user interface, wherein the user interactions comprise one or more manual user inputs;
retrieving a list of runtime errors that have occurred in a system resulting from the user interactions;
for each runtime error in the list, identifying a type of the runtime error comprising one of a first type and a second type and retrieving a corresponding call stack comprising a sequence of function calls that led to the runtime error;
storing information from the call stack;
correlating the recorded user interactions with the function calls in the call stack; and
presenting a visual reproduction of processing steps leading up to the runtime error based on the correlations between the recorded user interactions and the function calls, the visual reproduction comprising one or more of a series or images, video frames, animation or a step-by-step visualization of events which occurred during a particular time interval and prior to one or more of the runtime errors in the list.

18. The non-transitory computer-readable medium of claim 17, wherein the first type corresponds to an Open Data Protocol (OData) error and the second type corresponds to a Web graphical user interface (WebGUI) error.

19. The non-transitory computer-readable medium of claim 17, wherein, in a case where the first type of the runtime error is identified,
retrieving an error log corresponding to runtime errors of the first type, including user information, timestamp information, and error message information;
for each entry in the error log, retrieving a corresponding call stack, wherein a last step in each call stack identifies a program that was invoked which led to an error; and
mapping the program identified in the last step with the list of runtime errors that have occurred in the system to determine whether the error is a result of a system dump.

20. The non-transitory computer-readable medium of claim 17, wherein, in a case where the second type of the runtime error is identified,
   extract input data associated with the user interactions of the one or more users with the user interface; and
   for each runtime error of the second type, retrieving a corresponding call stack and identifying the runtime error as resulting from a report or a transaction.

* * * * *